| United States Patent [19] | [11] Patent Number: 4,650,976 |
|---|---|
| Hiraishi | [45] Date of Patent: Mar. 17, 1987 |

[54] CARD PROCESSOR WITH FAIL-SAFE CARD RETURN UPON POWER FAILURE

[75] Inventor: Tomiyasu Hiraishi, Nagaokakyo, Japan

[73] Assignee: Omron Tateisie Electronics Co., Kyoto, Japan

[21] Appl. No.: 743,144

[22] Filed: Jun. 10, 1985

[30] Foreign Application Priority Data

Jun. 11, 1984 [JP] Japan .................................. 59-87974

[51] Int. Cl.⁴ ............................................. G06F 15/30
[52] U.S. Cl. .................................... 235/379; 235/377; 235/380
[58] Field of Search ......................... 235/379, 377, 380

[56] References Cited

U.S. PATENT DOCUMENTS 4,538,056 8/1985 Young .................................. 235/380

Primary Examiner—Harold I. Pitts
Attorney, Agent, or Firm—Stevens, Davis, Miller & Mosher

[57] ABSTRACT

This card processor includes an electrical driving means for operating either in a take in mode for conveying a card upon insertion thereof to a determinate position, or in an ejection mode for expelling a taken in card to the outside, and a control means for controlling supply of electrical energy to the electrical driving means so as to cause it to operate either in the take in mode or in the ejection mode. A non volatile memory means is set upon insertion of the card and reset upon expelling of the card. A first switch switches over supply of electrical power to the electrical driving means from the control means to a battery upon failure of normal power supply; a second switch supplies electrical power from the battery to the electrical driving means, upon detection of failure of normal power supply when the non volatile memory means is in the set state, in such a manner as to operate the electrical driving means to operate in its ejection mode; and a timer terminates the supply by the second switch of electrical power from the battery to the electrical driving means, after the supply has been performed for a determinate time interval. Thereby in the event of failure of normal power supply the card is guaranteed to be ejected from the card processor and is not retained in its inside, and accordingly does not become unavailable to the user.

3 Claims, 1 Drawing Figure

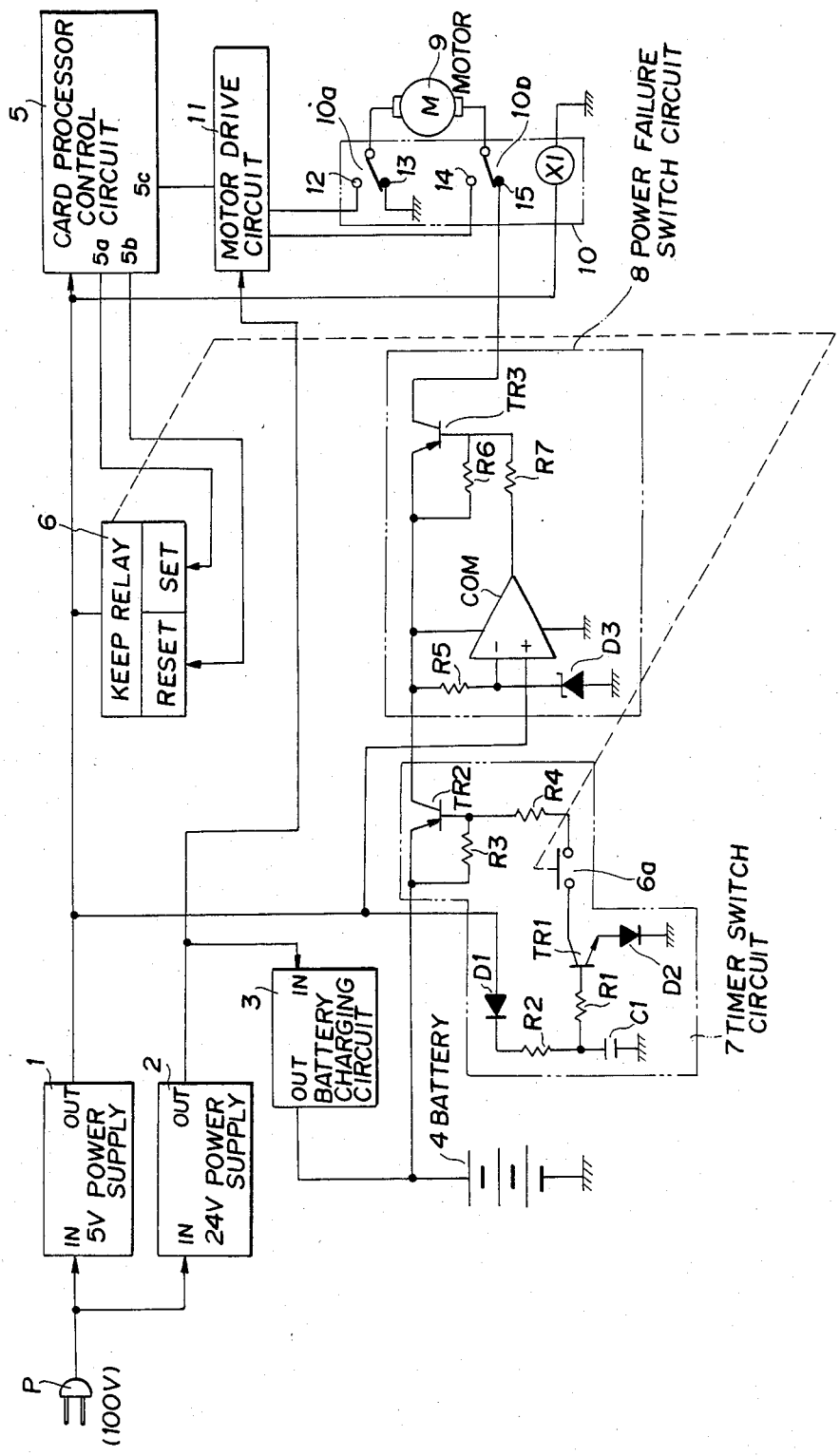

CARD PROCESSOR WITH FAIL-SAFE CARD RETURN UPON POWER FAILURE

BACKGROUND OF THE INVENTION

The present invention relates to a device for incorporation into an automatic cash transaction device for processing a card such as a cash card or the like, and in particular relates to such a card processing device which incorporates a mechanism for, in the event of failure of electrical power supply while a card is currently inserted into the device, automatically ejecting the card which is currently being processed to the outside and returning it to the customer.

An automatic cash transaction device such as a cash dispenser or an automatic teller machine is generally equipped with a card reader for reading data on cards which are provided to the users of the machine, i.e. to the customers of the institution providing the machine. Such data typically include the identification of the user, and may further include such additional data as credit rating and so on. In the content of this specification in the following, by the way, the use of the term "card reader" is to be taken as generically including other possible functions of such a device such as writing information on the card (which may be very important in the case of a so called "smart card" or the like), and is intended to refer in general to any device which processes such a card.

Such an automatic cash card transaction device, when a transaction is initiated by a user, typically starts its processing when a user's card is inserted through an input slot or the like into its interior, and then performs certain operations such as reading data which are impressed magnetically or otherwise on the card. At this time the card is no longer accessible to the user, because it has been removed from his or her reach. Once the transaction has been completed, the device then returns the card automatically, either through the insertion slot or through an output slot or other aperture. However, the problem has arisen that, if the supply of commercial power to the cash transaction device fails during the processing of a transaction after the user's card has been inputted into the interior of the device, then not only is the transaction interrupted and very likely aborted, but also it is likely that due to the failure of driving power the user's card will remain inside the cash transaction device and will become unavailable to him or her for as long as the interruption of power lasts. This naturally can be very troublesome, since the user may have urgent business elsewhere and may not have the time or inclination to remain in the vicinity of the cash transaction machine until the power supply is restored, and accordingly the user may become separated from his or her card for some time even due to a relatively short electrical stoppage of some few minutes. This albeit temporary loss of the card can lead to great difficulty for the user in obtaining cash from any such cash transaction device for some time, and further can lead to the user mistrusting the financial institution issuing the card and maintaining the cash transaction device; and such mistrust is liable to persist for a long time period.

SUMMARY OF THE INVENTION

Accordingly, it is the primary object of the present invention to provide a card processor for such a cash transaction device, which avoids the above identified problem.

It is a further object of the present invention to provide such a card processor for such a cash transaction device, which ensures that even in the event of power failure the customer is not deprived of his or her card.

It is a further object of the present invention to provide such a card processor for such a cash transaction device, which in the event of power failure automatically ejects to its outside any card which is being processed.

It is a further object of the present invention to provide such a card processor for such a cash transaction device, which is of a simple structure.

It is a further object of the present invention to provide such a card processor for such a cash transaction device, which is able to maintain the customer's trust in the financial institution served by the device.

According to the most general aspect of the present invention, these and other objects are accomplished by a card processor, comprising: (a) an electrical driving means for operating either in a take in mode for conveying a card upon insertion thereof to a determinate position, or in an ejection mode for expelling a taken in card to the outside; (b) a control means for controlling a supply of electrical energy to the electrical driving means so as to cause it to operate either in the take in mode or in said ejection mode; (c) a non volatile memory means for being set upon insertion of the card and for being reset upon expelling of the card; (d) a battery; (e) a first switch which switches over supply of electrical power to the electrical driving means from the control means to the battery upon failure of a normal power supply; (f) a second switch which supplies electrical power from the battery to the electrical driving means, upon detection of failure of normal power supply when the non volatile memory means is in the set state, in such a manner as to operate the electrical driving means to operate in its ejection mode; and (g) a timer which terminates the supply by the second switch of electrical power from the battery to the electrical driving means, after the supply has been performed for a determinate time interval.

According to such a structure, because the card may be ejected by the battery even when a power failure has developed while the card is in the taken in state, a measure against power failure may be provided without causing inconvenience to the user of the card, thereby allowing the device to be installed in an unattended cash transaction area. And because control with a computer system is not required for checking the possibility of power failure, it is not necessary to step down the battery voltage for supplying electric power to any computer CPU, and no program for coping with power failure is required, thereby providing the advantage of reducing the burden of software development and error, in addition to providing a notable advantage in simplification of the circuit structure.

BRIEF DESCRIPTION OF THE DRAWING

The present invention will now be shown and described with reference to the preferred embodiment thereof, and with reference to the illustrative drawing. It should be clearly understood, however, that the description of the embodiment, and the drawing, are all of them given purely for the purposes of explanation and exemplification only, and are none of them intended to be limitative of the scope of the present invention in any way, since the scope of the present invention is to be defined solely by the legitimate and proper scope of the appended claims. In the drawing, the sole FIGURE is a schematic diagram, part in block diagrammatic form and part as a circuit diagram, of the preferred embodiment of the card processor of the present invention.

DESCRIPTION OF THE PREFERRED EMBODIMENT

The present invention will now be described with reference to the preferred embodiment thereof, and with reference to the appended drawing, which schematically shows the relevant parts of the preferred embodiment. Commercial electric power from the 100 V mains is supplied via a plug P to the input side of a 5 V power supply 1 and to the input side of a 24 V power supply 2, both of which are of per se known types. The 5 V power supply 1 supplies electrical power at five volts from its output side to a card processor control circuit 5, to a keep relay 6, to a timer switch circuit 7, to a power failure switch circuit 8, and to a relay 10, while the 24 V power supply 2 supplies electrical power at twenty four volts from its output side to a battery charging circuit 3 for a battery 4 and to a motor drive circuit 11.

The relay 10 has two output terminals 10a and 10b which are connected to the input terminals of a motor 9 which drives a mechanism (not particularly shown) for propelling the card either from the hand of the user into the inside of the automatic cash transaction device or in the reverse direction. In detail: when the terminal 10a of the relay 10 is connected to the positive side of a DC electrical power source and the terminal 10b of the relay 10 is connected to the negative side of said DC electrical power source, then the motor 9 is actuated so as to drive the propelling mechanism to take in a card from a user into the inside of the cash transaction device; while on the other hand, when the terminal 10a of the relay 10 is connected to the negative side of said DC electrical power source and the terminal 10b of the relay 10 is connected to the positive side of said DC electrical power source, then said motor 9 is actuated so as to drive the propelling mechanism to eject the card from the inside of the cash transaction device to return it to the user.

Further, the relay 10 comprises switched terminals 12, 13, 14, and 15. When no electrical power is supplied to the coil of the relay 10, then the output terminal 10a of the relay 10 is electrically connected to the switched terminal 13 while its other output terminal 10b is electrically connected to the switched terminal 15; but, when on the other hand electrical power is supplied to the coil of relay 10, which is normally the case because the coil of relay 10 is connected directly to the output side of the 5 V power supply 1, then the output terminal 10a of relay 10 is electrically connected to the switched terminal 12 while its other output terminal 10b is electrically connected to the switched terminal 14. This relay 10 is referred to in the claims of this application as "the first switch".

These normally contacted switched terminals 12 and 14 are connected to the output of a motor drive circuit 11. The card processor control circuit 5 outputs an insertion signal to the motor drive circuit 11 upon insertion of the leading edge of a user's card into the input slot (not shown) of the card processor, and also outputs an insertion pulse from its terminal 5a to a SET terminal of a keep relay 6. On the other hand, when processing of a transaction involving a taken in card has been completed—this processing is performed by a main control unit which is not shown in the figures—then said main control unit outputs an eject signal to the motor drive circuit 11, and subsequently upon completion of ejection of the card an ejection pulse is outputted from the terminal 5b of the card processor control circuit 5 to the RESET terminal of the keep relay 6.

The motor drive circuit 11, upon receipt of the insertion signal from the card processor control circuit 5, supplies the switched terminal 12 of the relay 10 with power from the positive side of the 24 V electrical power supply 2, so that the positive side of the 24 V electrical power is supplied to the output terminal 10a of relay 10, and also supplies the switched terminal 14 of the relay 10 with power from the negative side of the 24 V electrical power supply 2, so that the negative side of the 24 V electrical power is supplied to the output terminal 10b of relay 10. Accordingly, as explained above, the motor 9 is so activated as to drive the card propelling mechanism to take in the user's card into the inside of the cash transaction device; and this action is maintained until the card has reached a determinate position inside the cash transaction device, at which point the operation of the motor 9 is stopped by a means which is not particularly shown. Thus a user's card is taken into the inside of the cash transaction device.

On the other hand, the motor drive circuit 11, upon receipt of such an ejection signal from the card processor control circuit 5, supplies the switched terminal 12 of the relay 10 with power from the negative side of the 24 V electrical power supply 2, so that the negative side of the 24 V electrical power is supplied to the output terminal 10a of relay 10, and also supplies the switched terminal 14 of the relay 10 with power from the positive side of the 24 V electrical power supply 2, so that the positive side of the 24 V electrical power is supplied to the output terminal 10b of relay 10. Accordingly, as explained above, the motor 9 is so activated as to drive the card propelling mechanism to eject the user's card from the inside of the cash transaction device to the outside; and this action is maintained until the card has definitely left the inside of the cash transaction device, at which point the operation of the motor 9 is again stopped by a means which is not particularly shown. Thus a user's card is ejected from the inside of the cash transaction device.

Further, as explained above, when the insertion signal is thus sent from the card processor drive circuit 5 to the motor drive circuit 11 to take in a user's card, at the same time a SET pulse is supplied from the terminal 5a of said card processor drive circuit 5 to the SET terminal of the keep relay 6, which causes keep relay 6 to transit to the SET state. On the other hand, when the ejection signal is thus sent from the card processor drive circuit 5 to the motor drive circuit 11 to eject a user's card to the outside, at the same time a RESET pulse is supplied from the terminal 5b of card processor drive circuit 5 to the SET terminal of the keep relay 6, which causes keep relay 6 to transit to the RESET state. Accordingly, the keep relay 6 is caused to be SET or RESET, according as to whether there is currently present a user's card inside the cash transaction device, or not. This keep relay 6 is referred to in the claims of this application as "the non volatile memory device". The keep relay 6 operates a relay switch 6a, incorporated in the timer switch circuit 7 which will be described hereinafter; the keep relay 6 when in the SET state closes relay switch 6a, and when in the RESET state opens relay switch 6, and the relay switch 6a turns ON and OFF the action of the timer switch circuit 7. This timer switch circuit 7 is connected to the battery 4 (which is kept in a charged state by the battery charging circuit 3) in such a way that when the timer switch circuit 7 is ON the battery 4 is electrically connected to a power failure switch circuit 8, while when the timer switch circuit 7 is OFF the battery 4 is electrically disconnected from power failure switch circuit 8.

In detail, the timer switch circuit 7 comprises a timer circuit comprising a transistor TR1, diodes D1 and D2, a capacitor C1, and resistors R1 and R2, and further comprises a switch circuit comprising a transistor TR2 and resistors R3 and R4. During the time that the voltage of the 5 V electrical power source 1 is being supplied to the base of the transistor TR1 and until the time that the electric charge in the capacitor C1 is discharged through the resistor R1 and the transistor TR1, the timer circuit keeps the collector and the emitter of the transistor TR1 in a conducting state. The switch circuit turns ON the transistor TR1 when the relay switch 6a is closed, and the transistor TR1 is in the conducting state and turns OFF the transistor TR2 when either one of the conditions is not met, or in other words when the base of the transistor TR2 is not grounded.

The power failure switch circuit 8 comprises a comparator COM, a Zener diode D3, a transistor TR3, and resistors R5, R6, and R7. The non inverting input terminal of the comparator COM receives the voltage from the 5 V electrical power source 1, and the inverting input terminal of the comparator COM receives the voltage of the battery 4 by way of the timer switch circuit 7 with the voltage stabilized to 5 V by the Zener diode D3. The output terminal of this comparator COM is connected to the base of the transistor TR3 by way of the resistor R7. The emitter of the transistor TR3 receives the electric power from the battery 4 by way of the timer switch circuit 7, and the collector of the transistor TR3 is connected to the normally not used (i.e., only connected to in the event of electrical power failure, as explained above) switched terminal 15 of the relay switch 10. The other normally not used switched terminal 13 of the relay switch 10 is grounded. When the voltage inputted to the non inverting terminal of the comparator COM drops below the voltage supplied to the inverting input terminal, the output terminal becomes grounded. As a result, electric current flows through the base of the transistor TR3, turning ON the transistor TR3. This power failure switch circuit 8 is referred to in the claims of this application as "the second switch".

Now, the action of the card processor described above according to the preferred embodiment of the present invention will be explained.

When the supply of commercial electric power at 100 V to the plug P is being properly maintained, then the 5 V electrical power source 1 continually supplies five volt electrical power at its output side, and thus the coil of the relay switch 10 is continuously energized. This causes the terminals of the motor 9 to be continuously connected to the output of the motor drive circuit 11 through the terminals 10a, 10b, 12, and 14 of the relay switch 10 as explained above, and therefore the taking in and ejection of users' cards is performed normally, as also explained above, according to the control signals from the card processor control circuit 5. Therefore in this operational condition the actions of the battery 4, the timer switch circuit 7, and the power failure switch circuit 8 do not affect the action of the card processor or of the cash transaction device.

When, on the other hand, the supply of commercial electric power at 100 V to the plug P fails after a user's card has been taken in and while the card is still in the inside of the cash transaction device, then the 5 V electrical power source 1 ceases to supply five volt electrical power at its output side, and thus the coil of the relay switch 10 is deenergized. As explained above, this causes the terminals of the motor 9 to become disconnected from the output of the motor drive circuit 11, and to instead become connected to ground and to the output of the power failure switch circuit 8, through the terminals 10a, 10b, 13, and 15 of the relay switch 10. And, since as explained above it is here assumed that a user's card is inside the cash transaction device, the keep relay 6 is currently in the SET state, so that the relay switch 6a is currently in the closed condition. Therefore, in this operational condition, until the capacitor C1 becomes discharged, the transistors TR1 and TR2 remain in the ON state, thus supplying the voltage of the battery 4 to the power failure switch circuit 8. At this time, since there is no output from the 5 V power source 1 which is connected to the non inverting input terminal of the comparator COM, the output terminal of the comparator COM is grounded. As a result, the transistor TR3 turns ON and the voltage of the battery 4 is currently being supplied to the relay switch terminal 15, thus driving the motor 9 so as to eject the card out from the inside of the cash transaction device. Since the capacitor C1 takes a certain time interval to become discharged (typically two to three seconds), and then turns OFF the transistors TR1 and TR2, the motor 9 is driven for that time period and then is stopped. Thus, by driving the motor 9, the card is ejected out through the insertion slot therefor, and further the motor is automatically stopped after card ejection.

It is seen therefore that, according to the shown card processor according to the preferred embodiment of the present invention, because the card may be ejected by the battery even when a power failure has developed while the card is in the taken in state and is inside the card processor, a measure against power failure is provided without causing inconvenience to the user of the card, thereby allowing the device to be installed in an unattended cash transaction area. And because no computer system is required for checking the possibility of power failure, it is not necessary to step down the voltage of the battery 4 for supplying electric power to any computer CPU, and no program for coping with power failure is required to be developed, thereby providing the advantage of reducing the burden of software development and error, in addition to providing a notable advantage in simplification of circuit structure.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, although the non volatile memory means in the shown preferred embodiment of the present invention was the set relay 6, in another embodiment said non volatile memory means may also be a memory which is backed up by a battery. Other variations are also possible. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

What is claimed is:

1. A card processor, comprising:
   (a) an electrical driving means for operating either in a take in mode for conveying a card upon insertion thereof to a determinate position, or in an ejection mode for expelling a taken in card to the outside;
   (b) a control means for controlling supply of electrical energy to said electrical driving means so as to cause it to operate either in said take in mode or in said ejection mode;
   (c) a non volatile memory means for being set upon insertion of said card and for being reset upon expelling of said card;
   (d) a battery;
   (e) a first switch which switches over supply of electrical power to said electrical driving means from said control means to said battery upon failure of normal power supply;
   (f) a second switch which supplies electrical power from said battery to said electrical driving means, upon detection of failure of normal power supply when said non volatile memory means is in the set state, in such a manner as to operate said electrical driving means to operate in its said ejection mode; and
   (g) a timer which terminates said supply by said second switch of electrical power from said battery to said electrical driving means, after said supply has been performed for a determinate time interval.

2. A card processor according to claim 1, wherein said non volatile memory means is a keep relay.

3. A card processor according to claim 1, wherein said electrical driving means is an electric motor, comprising a plurality of terminals, which operates either in said take in mode for conveying a card upon insertion thereof to a determinate position, or in said ejection mode for expelling a taken in card to the outside, according to the polarity of electrical power supply to its said terminals.

* * * * *